(12) United States Patent
Hattori et al.

(10) Patent No.: US 8,487,389 B2
(45) Date of Patent: Jul. 16, 2013

(54) UNIAXIAL ACCELERATION SENSOR

(75) Inventors: Atsuo Hattori, Hamamatsu (JP); Junya Matsuoka, Hamamatsu (JP)

(73) Assignee: Yamaha Corporation, Hamamatsu-Shi, Shizuoka-ken (JP)

( * ) Notice: Subject to any disclaimer, the term of this patent is extended or adjusted under 35 U.S.C. 154(b) by 393 days.

(21) Appl. No.: 12/831,954

(22) Filed: Jul. 7, 2010

(65) Prior Publication Data

US 2011/0006380 A1     Jan. 13, 2011

(30) Foreign Application Priority Data

Jul. 10, 2009 (JP) ................................. 2009-163621

(51) Int. Cl.
*H01L 29/84* (2006.01)
*G01P 15/08* (2006.01)
*G01L 9/00* (2006.01)

(52) U.S. Cl.
USPC ..... 257/419; 257/415; 257/417; 257/E29.324

(58) Field of Classification Search
None
See application file for complete search history.

(56) References Cited

U.S. PATENT DOCUMENTS

| | | |
|---|---|---|
| 5,889,311 A | 3/1999 | Shinogi et al. |
| 5,914,635 A | 6/1999 | Yamamoto |
| 6,158,283 A | 12/2000 | Shinogi et al. |
| 2007/0017289 A1 | 1/2007 | Sakamoto |
| 2007/0037310 A1 | 2/2007 | Seto |
| 2007/0215966 A1 | 9/2007 | Ikegami |

FOREIGN PATENT DOCUMENTS

| | | |
|---|---|---|
| DE | 10 2005 054 143 A1 | 5/2007 |
| EP | 0793103 A2 | 9/1997 |
| EP | 2 065 929 A1 | 6/2009 |
| JP | 08-160066 A | 6/1996 |
| JP | 09-232596 A | 9/1997 |
| JP | 09-237901 A | 9/1997 |
| JP | 11-160346 A | 6/1999 |
| JP | 2000275271 A * | 10/2000 |
| JP | 2008139136 A * | 6/2008 |

OTHER PUBLICATIONS

Chinese Office Action issued for counterpart Chinese Application 2010102275960, dated Jan. 4, 2012.

\* cited by examiner

*Primary Examiner* — Hoang-Quan Ho
(74) *Attorney, Agent, or Firm* — Dickstein Shapiro LLP

(57) ABSTRACT

One-dimensional acceleration sensor includes: a semiconductor substrate having a constant thickness; parallel second through trenches through the substrate defining a flexible beam therebetween, having width significantly smaller than thickness; four piezo resistors formed at four corner regions of the flexible beam; first through trench through the substrate, continuous with ends of the first through trenches to define a weight continuous with one end of the flexible beam, including a pair of symmetrical first portions sandwiching the flexible beam and a second portion coupling the first portions and one end of the flexible beam, and having a center of gravity at an intermediate position on a longitudinal center line of the flexible beam; and one-layer wirings formed above the flexible beam, serially connecting piezo resistors at a same edge, and leading interconnection points generally along a longitudinal direction of the flexible beam.

11 Claims, 7 Drawing Sheets

UNIAXIAL ACCELERATION SENSOR

CROSS-REFERENCE TO RELATED APPLICATION

This is an application based upon and claims the benefit of priority of the prior Japanese Patent Application No. 2009-163621, filed on Jul. 10, 2009, the entire contents of which are incorporated herein by reference.

FIELD

The present invention relates to a uniaxial acceleration sensor.

BACKGROUND

Microelectramechnical system (MEMS) sensors such as acceleration sensors, vibration gyroscopes and vibration sensors are conventionally known which MEMS sensors convert a displacement of a flexible beam coupling a mass body into an electrical signal. Silicon processing technologies have been developed highly along with the advancement of integrated circuits, and are suitable for manufacturing MEMS. Charge carriers (electrons, holes) in silicon are influenced by stress application. Electron mobility increases as a tensile stress along a transport direction increases, and reduces as a compressive stress along a transport direction increases. Positive hole mobility increases as a compressive stress along a transport direction increases, and reduces as a tensile stress along a transport direction increases. A surface of a semiconductor layer receives a tensile stress as the semiconductor layer is deformed in a convex shape, and receives a compressive stress as the semiconductor layer is deformed in a concave shape. Change in the mobility of charge carriers in semiconductor can be detected by fabricating a semiconductor device such as a resistor or a MOS transistor in a silicon region receiving a strong stress. For example, an acceleration is detected by detecting change in a resistance value (piezo resistor) caused by a stress. A mass body is coupled to one end of a flexible beam supported to a support or the like at the other end. Since the mass body has an inertia, as the support moves, the flexible beam is deformed and receives a stress. As a cross sectional area of the flexible beam is made small, a stress per unit cross-sectional area becomes large and deformation amount becomes large.

Generally, piezo resistors are formed on a flexible beam in order to detect acceleration. Considering the convenience of fabrication processes, it is desired that piezo resistors and wirings are formed on a front surface of a flexible beam. In order to improve detection precision, a bridge circuit is generally formed by four piezo resistors. For example, four piezo resistors are formed at both edges in a width direction, near at opposite ends of the flexible beam. A resistor increasing a resistance value and a resistor reducing a resistance value upon application of a certain stress are serially connected. Two serial connections are connected in antiparallel direction between power supply wirings. Voltage difference between interconnection points in the respective serial connections is detected.

There is an acceleration sensor for detecting acceleration in one-dimensional direction as well as acceleration sensors for detecting acceleration in two- or three-dimensional directions. It is desired that a one-dimensional acceleration sensor detects acceleration only in a predetermined direction, and does not respond to accelerations in other directions.

JP-A-8-160066 proposes a cantilever type acceleration sensor constituted of a fixed portion, a weight movable by acceleration, a flexible beam connecting the fixed portion and the weight, and resistor elements disposed in the flexible beam, formed by processing a silicon substrate, wherein the flexible beam is narrower than the weight in a width direction perpendicular to a thickness direction of the silicon substrate, and has the same thickness as the weight in the thickness direction of the silicon substrate. A center of gravity of the weight is aligned on an extension line of the center line of the flexible beam. The flexible beam is deformable in the width direction in in-plane directions of the substrate surface, and deformation by acceleration in the longitudinal direction of the flexible beam is suppressed. Two pairs of resistor elements are formed in a flexible beam surface area at both edge regions adjacent to the fixed portion and to the weight. As the flexible beam is inflected and deformed in the width direction, two resistor elements at one edge are compressed, and two resistor elements at the other edge are stretched.

SUMMARY

An object of the present invention is to provide a uniaxial acceleration sensor having a novel structure.

According one aspect of the present invention, there is provided a one-dimensional acceleration sensor formed from a semiconductor substrate having a constant thickness, including:

a support made from the semiconductor substrate, patterned by a first through trench extending through the semiconductor substrate excepting a portion, disposed outside the first through trench and provided with bonding pads;

a flexible beam patterned by a pair of second through trenches continuous with opposing ends of the first through trench, the second through trenches extending in one direction inside the support and through the semiconductor substrate, the flexible beam having a width significantly smaller than the thickness of the semiconductor substrate, extending in the one direction from the portion of the support, and having four piezo resistors disposed at both edges on a proximal side of the flexible beam and at both edges on a distal side of the flexible beam; and a weight continuous with distal end of the flexible beam, the weight being patterned by the first through trench and second through trenches, having a pair of symmetrical first portions sandwiching the flexible beam therebetween and a second portion coupling the pair of first portions inside the support, and having a center of gravity on a center line of the flexible beam at a position nearer to the proximal side than the distal end of the flexible beam, wherein the one-dimensional acceleration sensor further includes wirings above the semiconductor substrate formed from a one wiring layer, the wirings connecting each two piezo resistors at a same edge among the four piezo resistors, in series, forming a bridge circuit with the four piezo resistors, and leading interconnection points of the piezo resistors to the bonding pads.

DESCRIPTION OF THE PREFERRED EMBODIMENTS

Suppose now that a uniaxial acceleration sensor is fabricated, for example, by using a silicon substrate. In a silicon substrate in-plane, x- and y-axes are defined, and in a thickness direction z-axis is defined. A y-direction uniaxial acceleration sensor is configured in such a manner that a flexible beam having a width in y-direction considerably thinner than a thickness in z-direction extends in x-direction, and couples a support and a weight (mass portion). The support is coupled to a fixed portion such as a housing. The thicknesses of the flexible beam and weight are made equal, and the center of gravity of the weight is aligned with an extension line of the flexible beam extending in x-direction. A response to an acceleration in x-direction is therefore suppressed fundamentally, and noises are able to be reduced. A response to an acceleration in z-direction is suppressed by making the flexible beam be hardly inflected in z-direction. It is therefore desired that a y-direction size is made considerably smaller than the z-direction size (substrate thickness) in a beam cross sectional area. An xy in-plane shape of the flexible beam is selected to ensure flexibility in y-direction, and allow piezo resistors to be fabricated at opposite ends at both edges. A bridge circuit is formed by serially connecting resistors having opposite polarities in change of a resistance value by a stress, and by connecting two serial connections in antiparallel.

In the configuration in which the weight is coupled to the distal end of the flexible beam and a force by an acceleration acts upon the distal end of the flexible beam, when the weight is driven in the width direction of the flexible beam, the flexible beam deforms in a bow shape. Two resistors positioned on the inner side of a bow shape receive a compressive stress and change the resistance values in one polarity (increase or decrease), and two resistors positioned on the outer side of the bow shape receive a tensile stress and change the resistance values in the opposite polarity (decrease or increase). If four piezo resistors are made of p-type silicon, the resistor receiving a compressive stress reduces its resistance value, whereas the resistor receiving a tensile stress increases its resistance value. Consider now the layout of wirings for connecting four piezo resistors and leading the wirings to the bonding pads. It is assumed that each wiring is formed not riding over the piezo resistor.

Figure 3A:
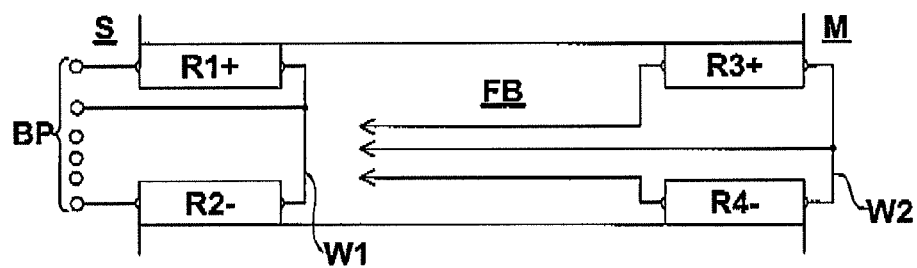
FIGS. 3A and 3B are plan views illustrating analysis and studies made by the present inventors.

As illustrated in FIG. 3A, four resistors R1 to R4 are formed at proximal and distal ends at both edges of a flexible beam FB. Suppose now that wirings W1 are formed for serially connecting the resistors R1 and R2 exhibiting changes in resistance values in opposite polarities, and for leading opposite terminals of the serial connection and an interconnection point of the resistors to bonding pads BP. The resistors R1 and R2 and wiring W1 connecting the resistors R1 and R2 traverse the whole width of the flexible beam FB. When wirings W2 are to be formed for serially connecting the resistors R3 and R4 at distal end at both edges of the flexible beam, exhibiting changes in resistance values in opposite polarities, and for leading out the end terminals and the interconnection point of the serial connection to the bonding pads BP, the wirings W2 should cross the wirings W1. That is, cross wirings are required. At least two wiring layers are necessary for forming cross wirings. If wiring spaces are formed between the edges of the flexible beam and the piezo resistors, it becomes possible to form a bridge circuit by using one wiring layer. However, when the piezo resistors are displaced away from the edges of the flexible beam, the most important precision of the measurement lowers. Alternately when the resistors R1 and R4 and the resistors R2 and R3 are serially connected, cross wirings are also required.

The present inventors have studied the case in which a flexible beam deforms in an S-character shape upon reception of an acceleration. When the flexible beam deforms in an S-character shape, deformation (convex direction) is opposite between the proximal and distal halves of the flexible beam. When deformation amount is represented as a function of a longitudinal distance from one end of the flexible beam, the second order differential or derivative will have opposite signs (plus and minus). In this case, resistance values of resistors formed at both edges at the same longitudinal position of the beam will change in opposite polarities, similar to the bow deformation. However, resistance values of two resistors formed at the same edge at the proximal and distal ends of the beam will also change in opposite polarities. Of the resistors formed at four corners of the flexible beam, two resistors at the diagonal positions will change the resistance values in the same polarity, and adjacent resistors along the edge or via the width will change the resistance values in the opposite polarities. When the adjacent resistors along the edge are connected in series, the wirings can be configured along the longitudinal direction of the beam, eliminating the cross wirings. Also in the S-character shape deformation, even if the moving distance of the distal end of the flexible beam is the same, angular change at the distal end of the flexible beam becomes small.

Figure 3B:
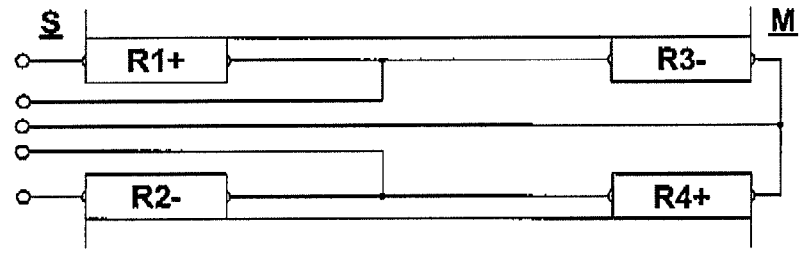

As illustrated in FIG. 3B, when the piezo resistors R1 and R3 and the piezo resistors R2 and R4 formed at the respective same edges of the flexible beam FB will exhibit resistance changes in opposite polarities, the respective two piezo resistors at the same edge can be serially connected. These wirings can be disposed fundamentally along the same edges. It is therefore unnecessary for the wirings to traverse the flexible beam in the width direction. Cross wirings are unnecessary even when the piezo resistors R3 and R4 at the distal end adjacent to a weight W are mutually connected and the interconnection point is led out to a bonding pad BP. Single layer wiring is made possible. It is also possible to make small an angular change at the distal end of the flexible beam FB. An angular change of the weight M is therefore made small. Even when the weight collides upon the support by an impact force, damages such as flaws and cracks at a weight corner is less likely to occur.

First Embodiment

Figure 1A:
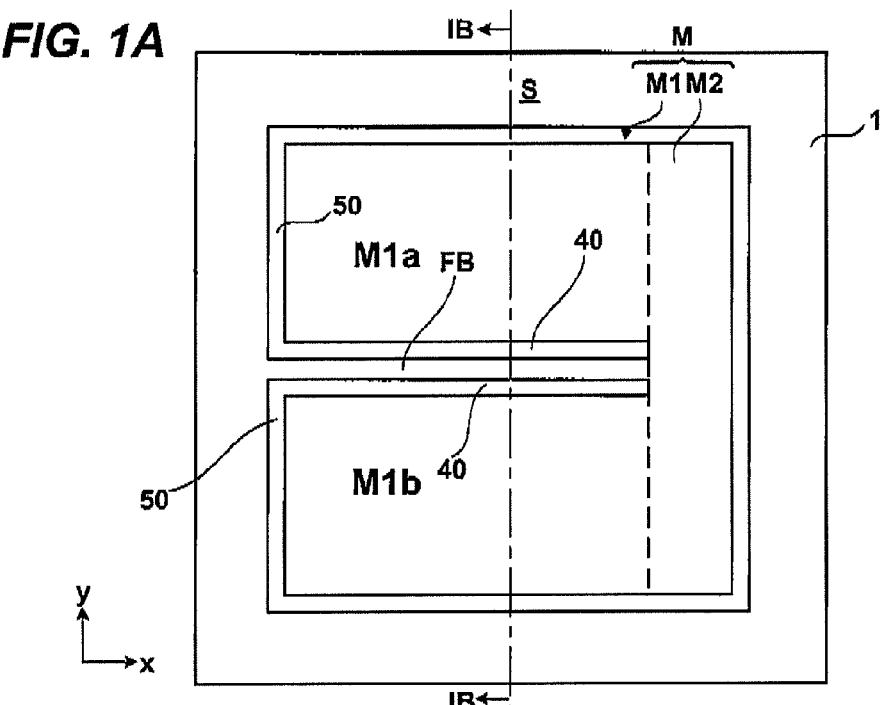
FIGS. 1A and 1B are a plan view and a cross sectional view of a uniaxial acceleration sensor according to the first embodiment.
Figure 1B:
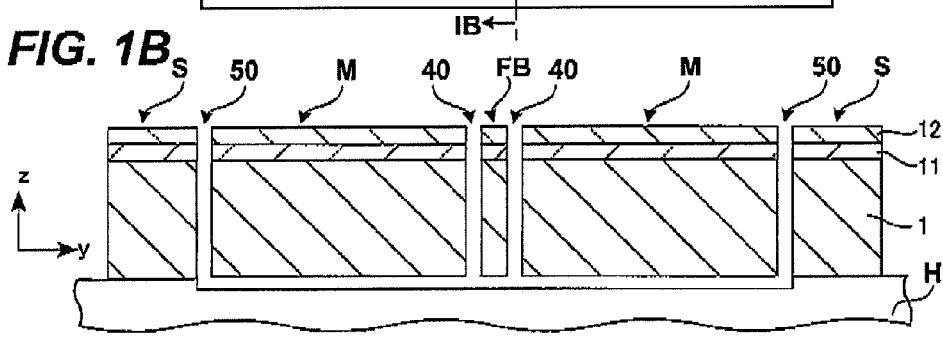

FIG. 1A is a schematic plan view of a uniaxial acceleration sensor according to the first embodiment. FIG. 1B is a cross sectional view taken along line IB-IB in FIG. 1A. A y-direction acceleration sensor is formed on a rectangular silicon substrate 1. The silicon substrate 1 has a predetermined thickness in z-direction. The lateral direction of the rectangle is represented by x-direction, and the vertical direction thereof is represented by y-direction. Along a center line interconnecting centers of opposing vertical (y-direction) sides of the silicon substrate 1, a pair of through trenches 40 are formed extending straightforward in x-direction to pattern a flexible beam FB extending in x-direction, between the through trenches 40. The flexible beam FB has fundamentally a constant width in y-direction. Through trenches 50 are formed along the left side of the silicon substrate, starting from two left side ends of the through trenches 40 in up- and down-directions by the same length. The through trenches 50 are then bent at a right angle in conformity with the left side corners of the silicon substrate and extended in the right direction by the same length, and then further bent at a right angle in conformity with the right side corners of the silicon substrate and extended in the vertical direction by the same length, to be finally joined in a right side area of the silicon substrate 1.

FIG. 1B illustrates the state that a silicon oxide film 11 and a silicon nitride film 12 are formed on the surface of the silicon substrate 1. The through trenches 40 and 50 are formed through the silicon nitride film 12, silicon oxide film 11 and silicon substrate 1. The flexible beam FB formed between a pair of through trenches 40 has a width considerably narrower than a thickness, and preferentially is deformable in the width direction. The region of the silicon substrate 1 outside the through trench 50 constitutes a support S which is to be connected to a fixed portion such as a housing H. The region between the through trenches 40 and 50 constitutes a weight (mass body) M. The weight M is separated from the support S by the through trench 50, and from the flexible beam FB by the through trench 40. As illustrated in FIG. 1A, the weight M is physically supported by the support S via only the flexible beam FB. As the weight M moves in y-direction, the widths of the trenches 40 and 50 change. As illustrated in FIG. 1A, the left end of the flexible beam FB is continuous with the support S, and the right end thereof is continuous with the weight M.

Separating the weight M by a straight line along y-direction passing the right end of the flexible beam, into a first part M1 on the left side and a second part M2 on the right side, a pair of opposing first portions M1a and M1b, constituting the first part M1, sandwich the flexible beam FB, and the second part M2 on the right side constitutes a coupling portion coupling the distal end of the flexible beam FB with the first portions M1a and M1b. A pair of first portions M1a and M1b has a shape mirror or line symmetric relative to the longitudinal center line of the flexible beam FB. The second part M2 also has a shape mirror or line symmetric with respect to the longitudinal center line of the flexible beam FB. With this shape, the flexible beam (more strictly, the acceleration sensor formed on the flexible beam) will not fundamentally respond to an acceleration in x-direction.

A center of gravity of the first part M1 is located on a center line of a y-direction width near at the center of the x-direction length of the flexible beam FB (shifted to the right by a half of the width of the through trench 50). The second part M2 extends to an area away from the distal end of the flexible beam FB. A center of gravity of the weight M=M1+M2 is biased from the center of gravity of the first part M1 to the right side (toward the distal end of the flexible beam). However, the plan shape of the weight M is so selected that a center of gravity of the weight M is disposed on the left side of the distal or right end of the flexible beam FB (on the center line of the flexible beam FB) by narrowing the x-direction width of the second part M2 less than the x-direction width of the first part M1. A center of gravity of the weight M is disposed on the longitudinal center line of the flexible beam FB (between the longitudinal center and the right end (distal end)).

The place of action from the weight to the flexible beam is at the distal or right end of the flexible beam and the center of gravity of the weight M is on the left (−x) side of the distal or right end of the flexible beam. Thus, an acceleration in y-direction applies, to the distal end of the flexible beam FB, a y-direction force and a rotational moment in the xy in-plane (in a direction of cancelling a deformation caused by the y-direction force). This will move the distal end of the flexible beam in y-direction, while deforming the longitudinal shape of the flexible beam in S-shape.

An exemplary size of the silicon substrate 1 is, e.g., 1 mm (x-direction)×1 mm (y-direction)×625 µm (z-direction, thickness). The thickness does not change over the whole region of the silicon substrate. For example, an outer size of the weight M is 800 µm α-direction)×800 µm (y-direction). The through trenches 40 and 50 have a width of about 15 µm, and extend through the silicon substrate (including the silicon oxide film, and silicon nitride film). The flexible beam FB has a size of 30 µm or narrower width (y-direction)×700 µm length (x-direction), and extends in x-direction. In this case, a size of the each first portion M1a and M1b of the weight M is roughly 700 µm (x-direction)×400 µm (y-direction), and a size of the second portion M2 of the weight M is about 100 µm (x-direction)×800 µm (y-direction). A cross sectional size of the flexible beam FB is 30 µm wide or narrower (y-direction)× 625 µm thick (z-direction, height), and a ratio of width/thickness is 1/20 or smaller. A thickness of a semiconductor substrate is generally 600 µm to 800 µm. It is possible to make a thickness as thin as about 100 µm. Even when the semiconductor substrate is thinned, the ratio of width/thickness of the flexible beam is preferably set to 1/10 or smaller. The width is significantly smaller than the thickness. A center of gravity of the weight M is disposed, on the 0-th approximation, at the center of the 800 µm square, i.e. at a position on the longitudinal center line of the flexible beam FB, and about 300 µm from the right end. The silicon oxide film 11 may be 1 µm thick, and the silicon nitride film 12 may be 0.5 µm thick. These values are exemplary and have no limitative meanings.

Figure 1C:
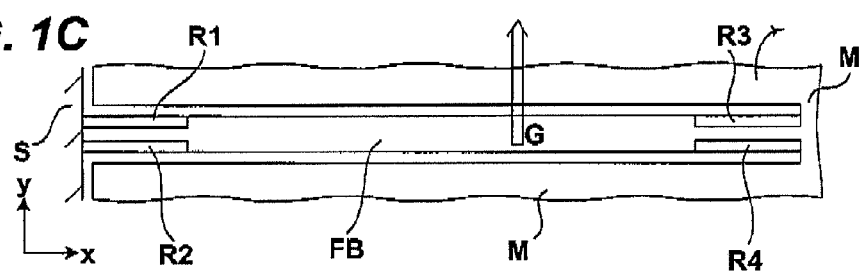
FIGS. 1C and 1D are schematic plan views illustrating the structure and operation of a flexible beam.
Figure 1D:

FIGS. 1C and 1D are a plan view of the flexible beam FB and a schematic plan view illustrating the function of the acceleration sensors. Resistors R1, R2, R3 and R4 are formed in both edge portions at the end portion on the support S side and in both edge portions at the end portion on the weight M side, respectively of the flexible beam FB. The resistors R1 to R4 may collectively be called as resistor R where appropriate. The piezo resistors R are preferably disposed near at the end portions and edge portions where a stress is concentrated. A center of gravity G of the weight M is on the left side of the right end of the flexible beam FB. As the weight M moves, e.g., in the +y direction (a thick arrow direction), the right end of the flexible beam FB coupled to the weight M receives an upward force and a clockwise rotational moment. If only the upward force is received, the flexible beam FB deforms upward in a bow shape. Since the flexible beam receives also the clockwise rotational moment, the right end of the flexible beam moves upward and also curves right down.

As illustrated in FIG. 1D, upon application of the +y direction force, the left portion of the flexible beam FB forms a downward convex curvature, and by the clockwise rotational moment, the right portion of the flexible beam FB forms an upward convex curvature. As a whole, deformation of the S-character shape is formed. It is therefore inferred that the resistors R1 and R4 receive a compressive stress and the resistors R2 and R3 receive a tensile stress. This inference was verified from simulation.

Figure 1E:
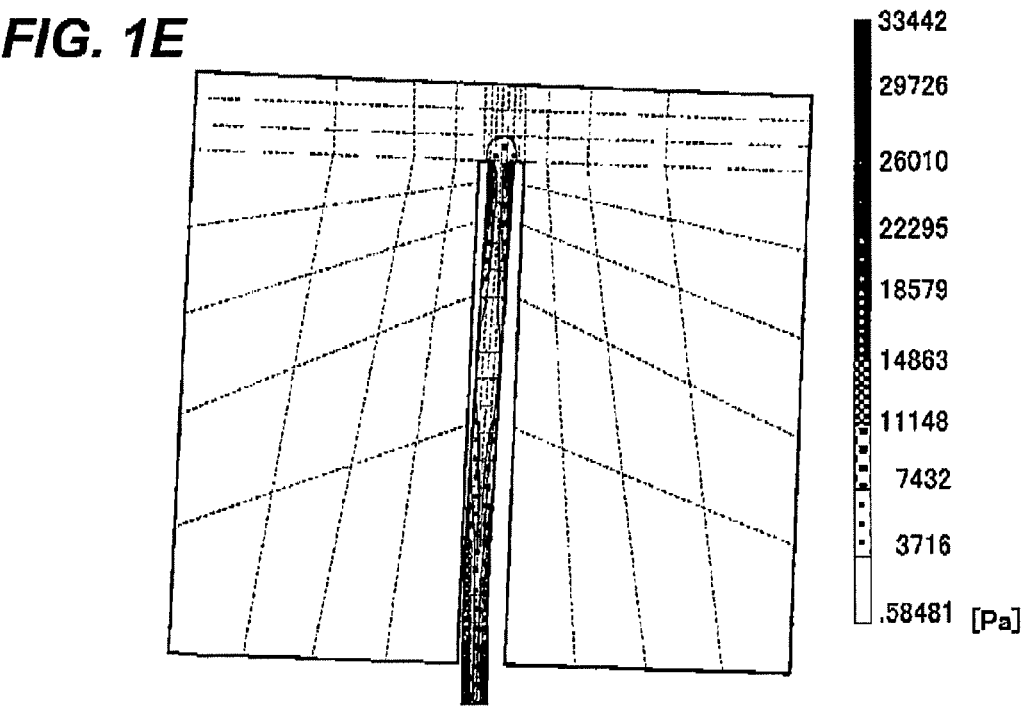
FIG. 1E is a diagram illustrating a simulation result.

FIG. 1E illustrates a simulation result indicating contour lines of a Mises stress upon application of 1 G acceleration.

The flexible beam has deformation of the S-character shape. A higher density of black points indicates a larger Mises stress. It is observed that stress increases toward the support S and the weight M coupling portions of the flexible beam, i.e., toward the opposite ends of the flexible beam. Stress also increases toward both edges in the width direction.

Figure 1F:
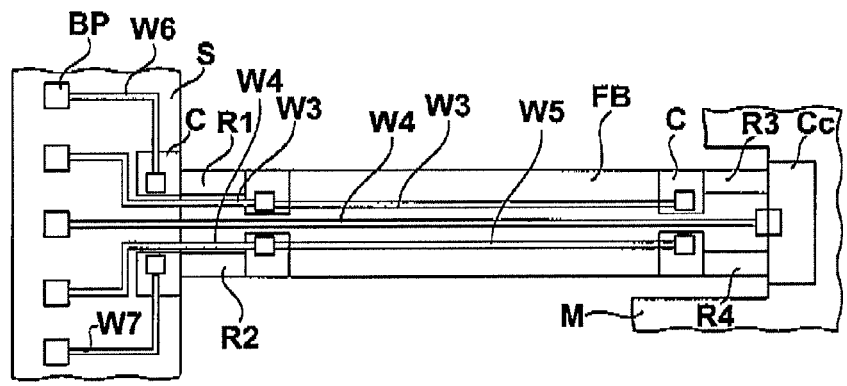
FIGS. 1F and 1G are a plan view and an equivalent circuit diagram of piezo resistors and wirings.

FIG. 1F is a top view illustrating the resistors R1, R2, R3 and R4 and wirings for the resistors. For example, a silicon substrate is of an n-type, and the resistors R1 to R4 are made of p-type regions diffused with, e.g., B. The outer end lines of the resistors R1 to R4 in the longitudinal direction are made flush with the opposite end lines of the flexible beam FB in the longitudinal direction. Respective resistors are disposed along both edges of the flexible beam. The opposite ends of the resistor are contiguous with low resistance contact regions C doped with B at a high concentration. The distal ends of the resistors R3 and R4 are connected to a common contact region Cc. Bonding pads BP formed in the same layer as that of the wirings are disposed at the peripheral or edge region of the support S. A width of the resistor R is 1.5 µm to 2.0 µm, and a length thereof is about 10 µm or longer which is shorter than a half of the length of the flexible beam FB. If the length is shorter than 10 µm, it is difficult to obtain practically sufficient uniformity. Since stresses of opposite directions are applied to the support side and weight side of the flexible beam, the length of the resistor is required to be shorter than a half of the length of the flexible beam, and more preferably the length is one third of, or shorter than one third of the length of the flexible beam. It is desired that a center of gravity of the weight M is positioned in an intermediate area defined between the resistors formed on the flexible beam on the support S side and weight W side.

Since two resistors having a width of 1.5 µm to 2.0 µm are formed spaced apart in the lateral direction, a width of the flexible beam FB is preferably 5 µm or wider. A cross sectional second order moment of the flexible beam is proportional to the cubic (to the third power) of a width of the flexible beam FB. When the width of the flexible beam FB exceeds 30 µm, a very heavy weight will be required in order to obtain a necessary sensitivity. For example, when a flexible beam width is 30 µm, a device size of 30 mm square will be required, to realize a sensitivity similar to that of the device size of 1 mm square having a flexible beam width of 10 µm. A flexible beam width is therefore preferably 5 µm or wider and 30 µm or narrower, and more preferably 5 µm or wider and 20 µm or narrower.

Three wirings are formed on the flexible beam FB: a straightforward wiring W3 for serially connecting the resistors R1 and R3 and leading its interconnection point to the support S; a straightforward wiring W5 for serially connecting the resistors R2 and R4 and leading its interconnection point to the support S; and a straightforward wiring W4 for leading a common contact region (interconnection point) of the two resistors R3 and R4 to the support S. Wirings W6 and W7 for leading the proximal side terminals of the resistors R1 and R2 are additionally formed on the support S. The wiring W3 to W7 have the least flections for connection to bonding pads BP on the support S. Since no cross wirings are used, it is possible to form wirings for a bridge circuit by wirings made of one layer. It is sufficient to use only a single wiring pattern mask of a simple shape.

Figure 1G:
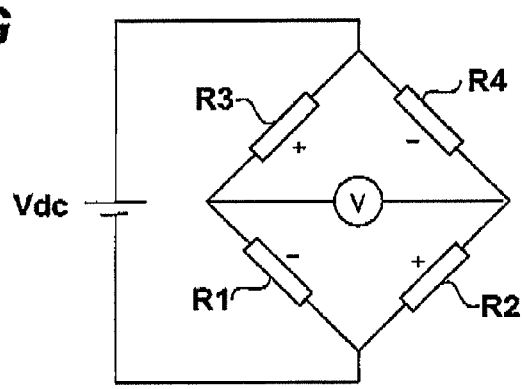

FIG. 1G is an equivalent circuit diagram of a bridge circuit. The resistors R1 and R3 and the resistors R2 and R4 constitute two serial connections. A voltmeter V is connected between the interconnection points of the two serial connections (via bonding pads). The resistors R3 and R4 are connected in common and is connected to a positive terminal of a DC power source Vdc (via bonding pads), and the resistors R1 and R2 on the other ends are connected to the negative terminal of the DC power source (e.g. ground) (via bonding pads).

As illustrated in FIG. 1C, when the weight M receives an acceleration in the +y direction (a reaction of an acceleration in y-direction relative to the support S), the flexible beam FB deforms in the S-character shape, the resistors R1 and R4 receive a compressive stress and lower the resistance values, and the resistors R2 and R3 receive a tensile stress and increase the resistance values. A voltage across the terminals of the voltmeter V of the bridge circuit increases so that the stress is detected. If the acceleration has the opposite direction, a polarity of a detected voltage is inverted.

Although the rectangular plan shape of the silicon substrate has been described, the plan shape is not limited to a rectangle.

Figure 2A:
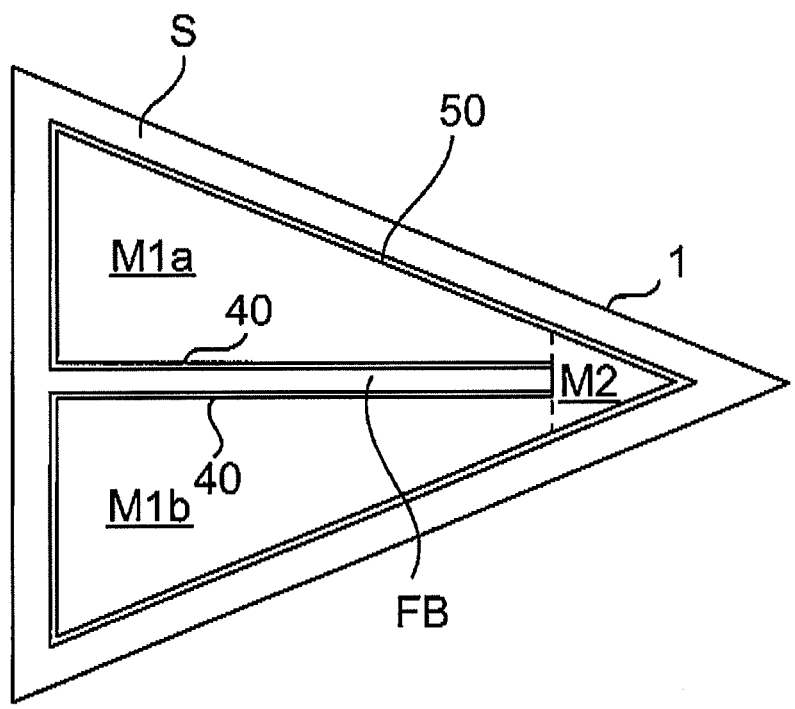
FIGS. 2A, 2B and 2C are plan views illustrating modifications of the first embodiment.

FIG. 2A illustrates a modification of a silicon substrate having a plan shape of an isosceles triangle. A through trench 50 is formed along outer sides of an isosceles triangle substrate 1 excepting the center area of the bottom side, and a support S is patterned outside the through trench 50. A pair of through trenches 40 in x-direction continuous with the ends of the through trench 50 is formed to pattern a flexible beam FB between the through trenches 40. A weight M is patterned between the support S and flexible beam FB. The flexible beam FB extends from the bottom center of the triangle toward the apex, and is continuous with the weight M. Similar to the first embodiment, a semiconductor wafer area is able to be used efficiently. When the weight is sectioned by a y-direction straight line passing the right end of the flexible beam, into a first part on the left side and a second part on the right side, a pair of first portions M1$a$ and M1$b$ constituting the first part have shapes line or mirror symmetrical relative to the center line of the flexible beam FB, and the second part M2 has also a shape which is line or mirror symmetrical relative to the center line of the flexible beam FB, similar to the first embodiment. This modification has a feature that a y-directional width of the weight M increases linearly toward the proximal end side, and a center of gravity G is easy to be disposed on the bottom side of the triangle.

In the above-described structure, each corner of the weight forms a right angle or an acute angle.

Figure 2B:
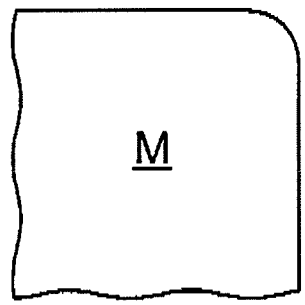
Figure 2C:
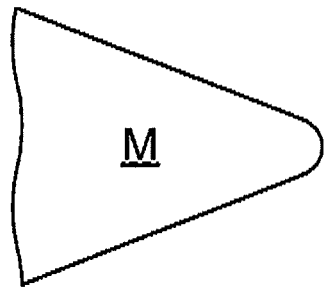

FIGS. 2B and 2C illustrate the structure that a weight corner is rounded in order to relax an impact upon collision. This modification may be used when necessary. Only some corners may be rounded and the remaining corners may not be rounded.

FIGS. 4A to 4E are cross sectional views explaining a manufacture method for an acceleration sensor.

Figure 4A:
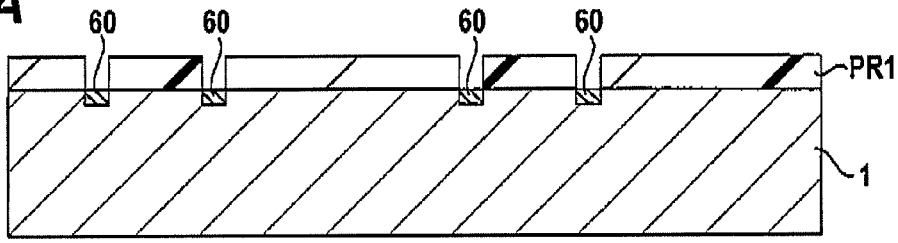
FIGS. 4A to 4E are cross sectional views illustrating manufacture processes for the acceleration sensor according to the first embodiment.

As illustrated in FIG. 4A, a photoresist pattern PR1 is formed on an n-type single crystal silicon substrate 1, and p-type impurity ions are implanted in the surface layer of the silicon substrate 1 at a high concentration to form low resistance portions 60 to be used as contact regions C. For example, boron (B) ions as p-type impurities are implanted at a concentration of $2\times10^{20}/cm^3$. After the photoresist pattern PR1 is removed, annealing is performed to activate the implanted p-type impurities B.

Figure 4B:
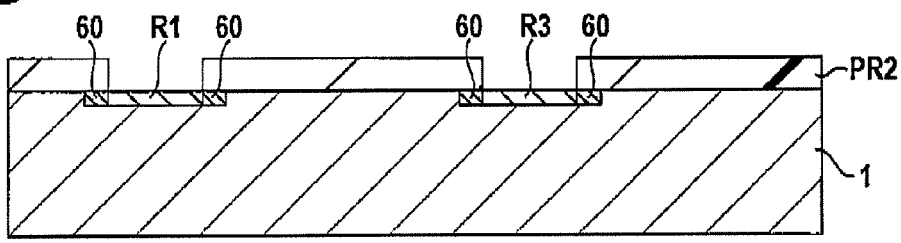

As illustrated in FIG. 4B, a new photoresist pattern PR2 is formed on the silicon substrate 1, and impurities are implanted in the surface layer of the silicon substrate 1 exposed in openings of the photoresist pattern PR2 to form piezo resistor elements R1 to R4. For example, B ions are implanted at a concentration of $2\times10^{18}/cm^3$, the photoresist pattern PR 2 is thereafter removed, and annealing is performed to activate p-type impurities B.

Figure 4C:
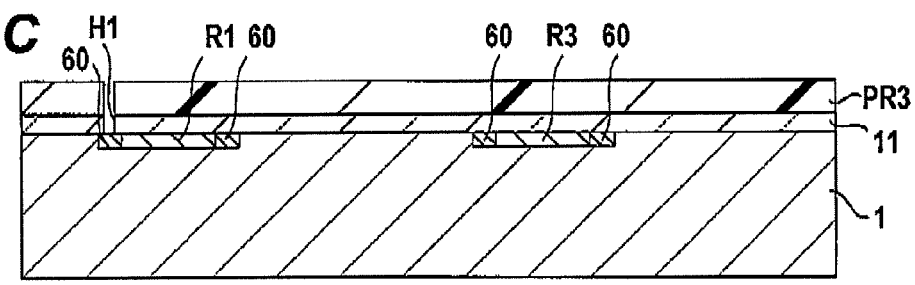

As illustrated in FIG. 4C, an insulating layer 11 is formed on the surface of the silicon substrate 1. A photoresist pattern PR3 is formed on the insulating layer 11, and the insulating layer 11 is etched to form a contact hole H1. As the insulating film 11, for example, an $SiO_2$ film or an $Si_xN_y$ film having a thickness of 1 μm is formed by plasma enhanced chemical vapor deposition (PE-CVD). An $SiO_x$ film may also be formed by low pressure (LP) CVD. For example, the contact hole H1 is formed by reactive ion etching using $CHF_3$. The photoresist pattern PR3 is thereafter removed.

Figure 4D:
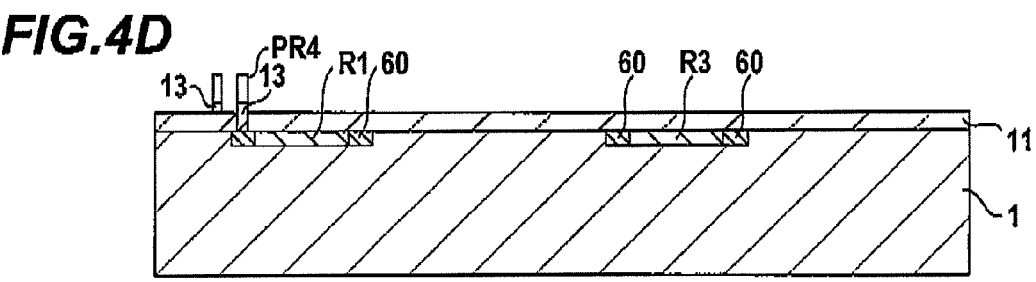

As illustrated in FIG. 4D, a wiring layer is formed on the insulating layer 11, and by using a photoresist pattern PR4, the wiring layer is etched to pattern wiring 13 and bonding pads 13. For example, Al layer of 0.6 μm thick is used as the wiring layer. A Ti film having a thickness of 300 angstrom may be formed as an adhesion layer before the Al film is formed. A $TiN_x$ film may be formed as a barrier metal layer before the Al film is formed. Al alloy such as AlSi and AlSiCu may also be used instead of Al. In etching the wiring layer, for example, reactive ion etching using $Cl_2$ gas is adopted. After the wiring layer is etched and the wiring 13 and bonding pads 13 are formed, the photoresist pattern PR4 is removed.

A passivation layer 12 is formed covering the insulating film 11, wiring 13 and bonding pads 13. By using a photoresist pattern, the passivation layer 12 is etched to form an opening exposing the bonding pads 13 (BP in FIG. 1F). The photoresist pattern is thereafter removed. In etching the passivation layer 12, reactive ion etching using $CHF_3$ is adopted.

Figure 4E:
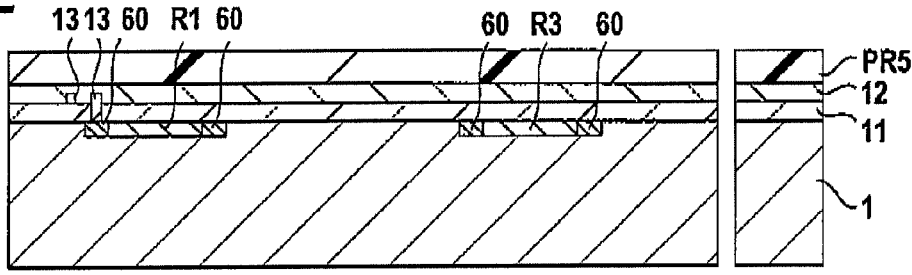

As illustrated in FIG. 4E, a photoresist pattern PR5 having openings for forming through trench is formed on the passivation layer 12. Using the photoresist pattern PR5; the passivation layer 12, insulating layer 11, and silicon substrate 1 are etched to form a through trench (40, 50 in FIG. 1A) and pattern a support S, a flexible beam FB and a weight M. More specifically, for example, reactive ion etching using $CHF_3$ is performed to etch the passivation layer 12 and insulating layer 11. Next, the silicon substrate 1 is etched by deep RIE by using the photoresist pattern PR5, passivation layer 12 and insulating layer 11 as a mask. For deep RIE, a Bosch process is used which alternately repeats in a short time a protection process by $C_4F_8$ and an etching process by $SF_6$ plasma. After the etching is completed, the photoresist pattern PR5 is removed. With these processes, it becomes possible to manufacture the acceleration sensor illustrated in FIGS. 1A to 1F.

Second Embodiment

Figure 5A:
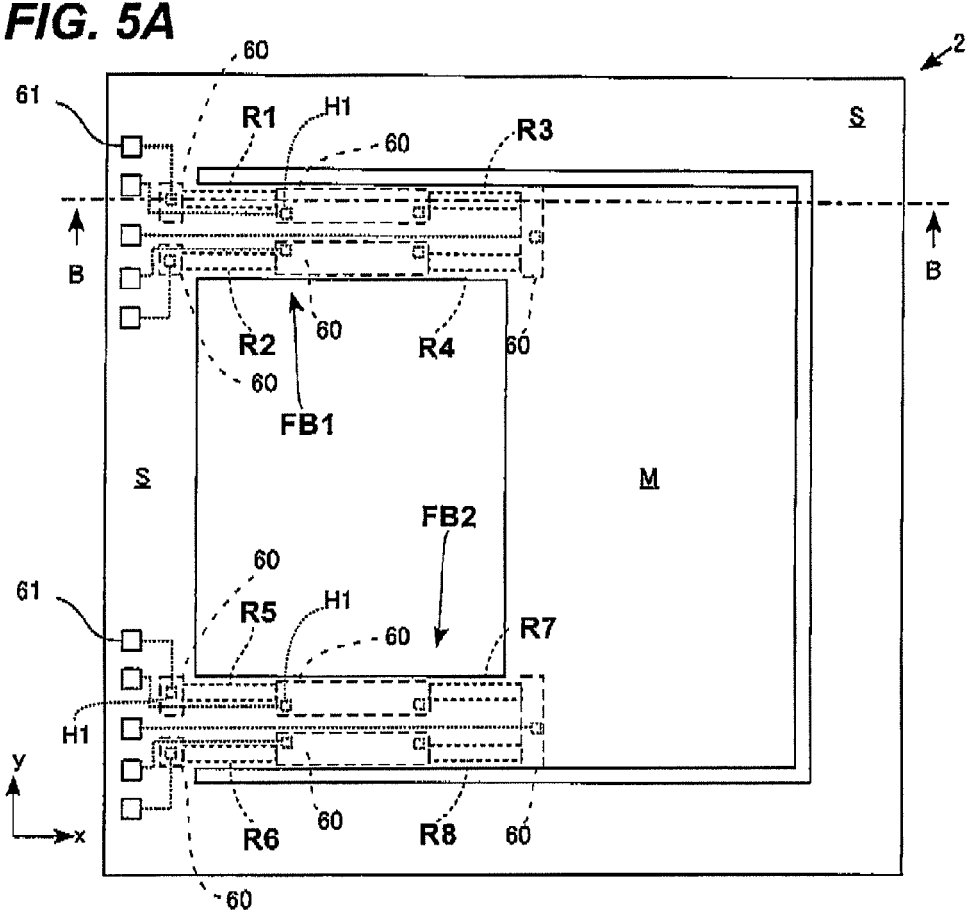
FIGS. 5A and 5B are a plan view and a cross sectional view of an acceleration sensor according to the second embodiment.
Figure 5B:
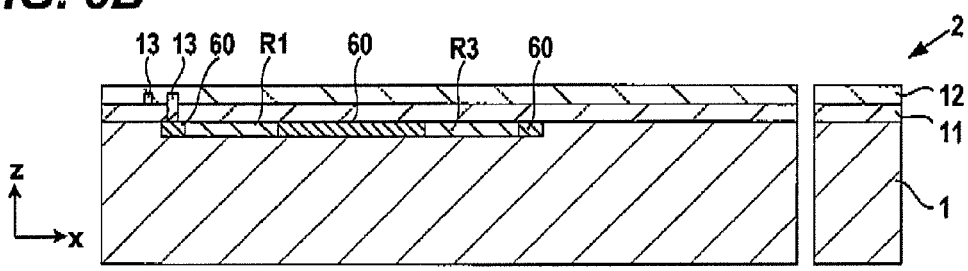

FIGS. 5A and 5B are a plan view and a cross sectional view illustrating an acceleration sensor 2 of the second embodiment. The acceleration sensor 2 has two flexible beams FBS, and F82 which are parallel in the longitudinal direction and couple a weight M and a support S. Each flexible beam has four piezo resistors (R1 to R4, R5 to R8) for constituting a bridge circuit. The structure of each flexible beam FB is similar to that of the first embodiment. The lamination structure of the semiconductor substrate is in common with the first embodiment.

(Operation)

As the weight M is accelerated in the y-axis direction, the weight M translates in the y-axis direction because the weight M is coupled to the support S via a plurality of parallel flexible beams which restrict the rotational motion of the weight. The flexible beams FB1 and FB2 deform therefore generally in the S-character shape. Similar to the first embodiment, it is therefore possible to constitute a bridge circuit by serially connecting piezo resistor elements adjacent at the same edge. Only a single wiring layer is used. Since it is possible to average stresses of the two flexible beams to derive an acceleration, S/N ratio is able to be improved.

(Manufacture Method)

The piezo resistor elements R1 to R4, and R5 to R8 and low resistance portions 60 serving as contact regions are formed at positions designed on the basis of the positions and sizes of the flexible beams FB1 and FB2. Openings of a photoresist pattern PR5 are designed for patterning the flexible beams FB1 and FB2, weight M and support S of the second embodiment to etch the silicon substrate 1, an insulating layer 11 and a passivation layer 12.

[Modifications]

Figure 6A:
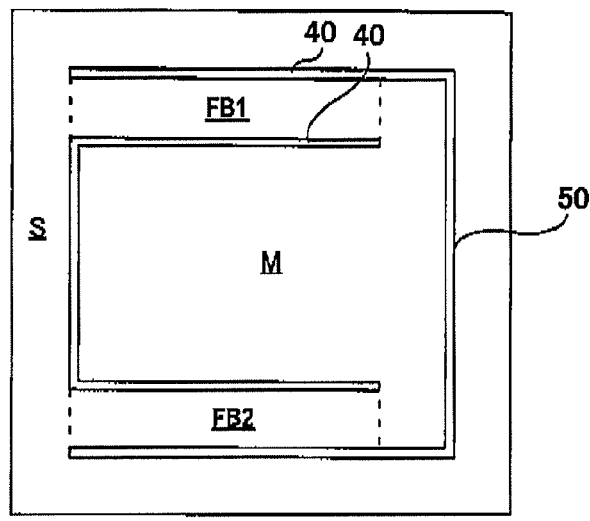
FIGS. 6A, 6B and 6C are plan views illustrating modifications of the second embodiment.
Figure 6B:
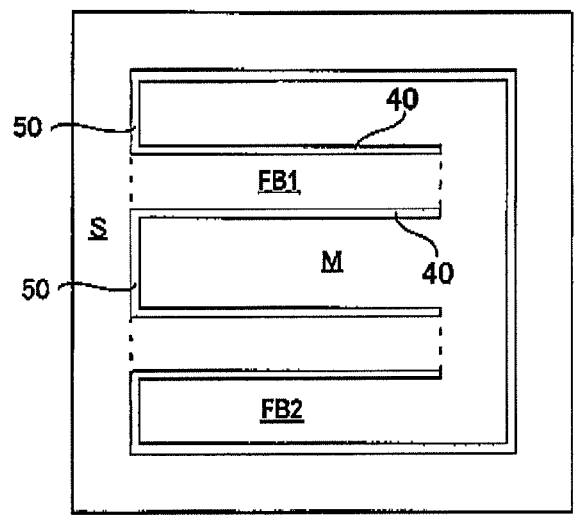
Figure 6C:
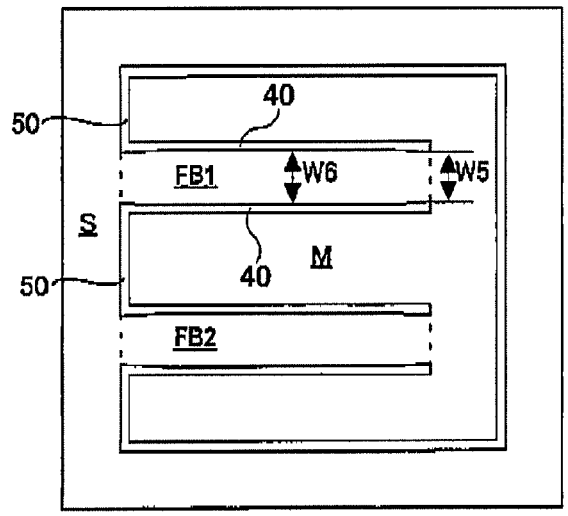

FIGS. 6A, 6B and 6C are plan views illustrating the modifications of the second embodiment. Drawn in FIGS. 6A to 6C are only a support S, flexible beams FB1 and FB2 and a weight M (each boundary is indicated by a broken line). In the modification illustrated in FIG. 6A, the left side of the weight M protrudes toward the support S. Similar to the first embodiment, it is therefore possible to increase a mass of the weight M and elongate the flexible beams FB1 and F2 in a limited space.

In the modification illustrated in FIG. 6B, two flexible beams FB1 and FB2 are disposed at positions inner than the upper and lower sides of the weight M. It may be considered that this configuration is formed by forming two sets of the flexible beam FB and weight M of the first embodiment and combining the two weights. The number of trenches increases more than that of the weight illustrated in FIG. 6A and the area of the weight side surface increases so that an air dumping effect is enhanced. For example, a vibration at a particular frequency is able to be attenuated quickly.

In the modification illustrated in FIG. 6C, widths of flexible beams FB1 and FB2 change with a position in the longitudinal direction. Widths W5 at the ends of the flexible beams F1 and FB2 are narrower than widths W6 at the central portions. As a force is applied to the weight M in the y-axis direction, it is therefore easy to form deformation in the end portions of the flexible beams F1 and FB2.

The technical scope of the present invention is not limited to the above-described embodiments. For example, the materials, sizes, shapes, film forming methods, and pattern transfer methods described in the embodiments are only exemplary. The above-described acceleration sensor may be manufactured by the following manufacture method. First, an insulating layer 11 is formed on the surface of a silicon substrate 1, and openings corresponding to contact regions are formed through the insulating layer 11. A photoresist pattern having openings corresponding to the regions where low resistor portions 60 and piezo resistor elements $R_x$ are to be formed, is formed on the surface of the insulating layer 11. For example, B ions are implanted at an acceleration energy allowing transmission through the insulating layer. For example, B ions are implanted into the contact regions at a concentration of $6\times10^{20}/cm^3$. The piezo resistor element region is also implanted through the insulating layer, and may have a B concentration of $2\times10^{18}/cm^3$ because some ions are shielded by the insulating layer. The piezo resistor elements $R_x$ and low resistor regions 60 are formed by performing only one impurity implantation process. Other processes, e.g. those for forming the wiring portions 13 and the like, may be similar to those of the above-described embodiments.

Although one or two flexible beams are used in the first and the second embodiments, three or more flexible beams may be used. Although a plurality of flexible beams of a cantilever type disposed on one side of a weight are used in the second embodiments, a plurality of flexible beams which are parallel in the longitudinal direction and are disposed on opposite sides of a weight, and are supported at opposite sides of the support may also be used. For example, relative to a weight M inside a rectangular support S, one end of each of two flexible beams is connected to each of two inner circumferential surfaces of the support S perpendicular to the x-axis direction, and the other end of each of two flexible beams is connected to each of opposite ends of the weight M in the x-axis direction.

It will be apparent for those skilled in the art various alterations, substitutions, improvements, combinations and the like can be made.

What are claimed are:

1. A one-dimensional acceleration sensor comprising:
a structure made of a semiconductor substrate having a constant thickness, comprising:
a support made of the semiconductor substrate, patterned by a first through trench extending through said semiconductor substrate excepting a portion, disposed outside said first through trench and provided with bonding pads;
a flexible beam patterned by a pair of second through trenches continuous with opposite ends of said first through trench, said second through trenches extending in one direction inside said support and through said semiconductor substrate, said flexible beam having a significantly narrower width than the thickness of said semiconductor substrate, extending from said portion of said support to a distal end in said one direction, and having four piezo resistors disposed at both edges on a proximal side of said flexible beam and at both edges on a distal side of said flexible beam; and
a weight continuous with the distal end of said flexible beam, said weight being patterned by said first through trench and said second through trenches, having a pair of symmetrical first portions sandwiching said flexible beam therebetween and a second portion coupling said pair of first portions and the distal end of the flexible beam inside said support, and having a center of gravity at a position on a longitudinal center line of the flexible beam, displaced from said distal end of said flexible beam toward said proximal side; and
wirings formed above said semiconductor substrate, and made from a same wiring layer, said wirings serially connecting each two piezo resistors at a same edge among said four piezo resistors, and leading interconnection points of the serial connections, distal ends of two piezo resistors on the distal side in common, and proximal ends of two piezo resistors on the proximal side, to said bonding pads.

2. The one-dimensional acceleration sensor according to claim 1, wherein a width of said flexible beam is 1/20 or narrower of a thickness of said semiconductor substrate.

3. The one-dimensional acceleration sensor according to claim 2, wherein the width of said flexible beam is 5 μm or wider and 30 μm or narrower.

4. The one-dimensional acceleration sensor according to claim 3, wherein the width of said flexible beam is 5 μm or wider and 20 μm or narrower.

5. The one-dimensional acceleration sensor according to claim 1, wherein said semiconductor substrate is made of n-type silicon, and said piezo resistors are made of p-type regions doped with B.

6. The one-dimensional acceleration sensor according to claim 5, wherein said piezo resistors have a width of 1.5 μm or wider and 2.0 μm or narrower and a length of 10 μm or longer and shorter than a half of a length of said flexible beam.

7. The one-dimensional acceleration sensor according to claim 6, wherein a length of said piezo resistors is 1/3 or shorter of a length of said flexible beam.

8. The one-dimensional acceleration sensor according to claim 7, further comprising contact regions of p-type low resistance continuous with opposite ends of each of said piezo resistors, and said wirings are connected to said contact regions.

9. The one-dimensional acceleration sensor according to claim 1, wherein said semiconductor substrate has a rectangular plan shape, and said flexible beam is disposed along a center line connecting center points of opposing sides.

10. The one-dimensional acceleration sensor according to claim 1, wherein said semiconductor substrate has an isosceles triangle plan shape, and said flexible beam is disposed along a straight line connecting a center point of a bottom side and an apex of the isosceles triangle.

11. A one-dimensional acceleration sensor comprising:
a semiconductor substrate having a constant thickness;
a pair of second through trenches formed in said semiconductor substrate through a full thickness of the semiconductor substrate, extending in parallel in one direction to define a flexible beam therebetween, the flexible beam having a significantly narrower width than the thickness of said semiconductor substrate;
four piezo resistors formed at both edges on both end regions of said flexible beam;
a first through trench formed in said semiconductor substrate through a full thickness of the semiconductor substrate, being continuous with ends of said second through trenches at one side to define a weight continuous with one end of said flexible beam, the weight having a pair of symmetrical first portions sandwiching said flexible beam therebetween and a second portion coupling said pair of first portions and said one end of the flexible beam, and having a center of gravity at a position on a longitudinal center line of the flexible beam, displaced from said one end of said flexible beam toward an opposite end; and
wirings formed above said flexible beam, and made from a same wiring layer, said wirings serially connecting each two piezo resistors at a same edge among said four piezo resistors, and leading interconnection points of the serial connections, and ends of two piezo resistors on the weight side in common generally along a longitudinal direction of the flexible beam.

* * * * *